(12) United States Patent
Taura (10) Patent No.: US 6,670,987 B1
(45) Date of Patent: Dec. 30, 2003

(54) CHROMINANCE SIGNAL PROCESSING CIRCUIT, CHROMINANCE SIGNAL PROCESSING METHOD AND CAMERA USING THEM

(75) Inventor: Yoshihiro Taura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/120,181

(22) Filed: Jul. 22, 1998

(30) Foreign Application Priority Data

Jul. 24, 1997 (JP) .......................................... P09-198021

(51) Int. Cl.⁷ ................................................ H04N 9/73
(52) U.S. Cl. ................................ 348/223.1; 348/225.1; 348/228.1; 348/655
(58) Field of Search ................................. 348/223, 225, 348/228, 655, 223.1, 225.1, 228.1; H04N 9/73

(56) References Cited

U.S. PATENT DOCUMENTS

| | | | | |
|---|---|---|---|---|
| 4,922,330 A | * | 5/1990 | Saito et al. ............... | 348/225.1 |
| 5,223,921 A | * | 6/1993 | Haruki et al. ............. | 348/223.1 |
| 5,659,357 A | * | 8/1997 | Miyano ...................... | 348/223 |
| 5,995,142 A | * | 11/1999 | Matsufune ................. | 348/223 |
| 6,075,562 A | * | 6/2000 | Sakaguchi et al. .......... | 348/223 |
| 6,108,037 A | * | 8/2000 | Takei .......................... | 348/225 |
| 2002/0027601 A1 | * | 3/2002 | Nakayama et al. ......... | 348/223 |

FOREIGN PATENT DOCUMENTS

| | | | | |
|---|---|---|---|---|
| JP | 09331537 A | * | 6/1996 | ............ H04N/9/04 |
| JP | 08186828 A | * | 7/1996 | ............ H04N/9/04 |
| JP | 09261666 A | * | 10/1997 | ............ H04N/9/04 |
| JP | 10065958 A | * | 3/1998 | ............ H04N/9/04 |

* cited by examiner

Primary Examiner—Wendy R. Garber
Assistant Examiner—Lin Ye
(74) Attorney, Agent, or Firm—Radar, Fishman & Grauer PLLC; Ronald P. Kananen (57) ABSTRACT

In white balance adjustment adopting a feedback control technique, after white balance has been established at a certain color temperature, a lead-in limiting frame may be shifted following the establishment of the white balance, causing an incorrect operation to be carried out for a next change in color temperature. In order to solve the problem described above, the present invention provides a chrominance signal processing circuit which comprises: white balance amplifiers with relative gains among R, G and B primary color signals thereof adjusted by using a feedback control technique; an integration circuit for computing chrominance difference signals R–G and B–G from the R, G and B primary color signals and integrating the chrominance difference signals R–G and B–G to produce integrated values for each field of the chrominance signals; and a controller for setting a lead-in limiting frame for limiting a range for establishing white balance with a reference point at a predetermined color temperature taken as a base and for continuously monitoring the magnitude of a shift of said integrated values output by said integration circuit from said reference point and, for integrated values existing inside said lead-in limiting frame after the shift, controlling the relative gains of the white balance amplifiers in accordance with the integrated values.

14 Claims, 11 Drawing Sheets

CONVERGENCE AT A LOW COLOR TEMPERATURE AND A CHANGE TO A HIGH COLOR TEMPERATURE

SINCE THE COLOR IS INSIDE THE LEAD-IN LIMITING FRAME AS SEEN FROM THE REFERENCE POINT, THE COLOR CAN BE LEAD IN.

FIG. 8B

CONVERGENCE AT A HIGH COLOR TEMPERATURE AND A CHANGE TO AN EVEN HIGHER COLOR TEMPERATURE

SINCE THE COLOR IS OUTSIDE THE LEAD-IN LIMITING FRAME AS SEEN FROM THE REFERENCE POINT, THE COLOR CAN NOT BE LEAD IN.

FIG.8D

CONVERGENCE AT A HIGH COLOR TEMPERATURE AND A CHANGE TO A LOW COLOR TEMPERATURE

SINCE THE COLOR IS INSIDE THE LEAD-IN LIMITING FRAME AS SEEN FROM THE REFERENCE POINT, THE COLOR CAN BE LEAD IN.

FIG.8C

CONVERGENCE AT A LOW COLOR TEMPERATURE AND A CHANGE TO AN EVEN LOWER COLOR TEMPERATURE

SINCE THE COLOR IS OUTSIDE THE LEAD-IN LIMITING FRAME AS SEEN FROM THE REFERENCE POINT, THE COLOR CAN NOT BE LEAD IN.

FIG. 10A
PRIOR ART

A COLOR SHIFT DUE TO AN INCREASE IN COLOR TEMPERATURE

FIG. 10B
PRIOR ART

AFTER AUTO WHITE BALANCE ALIGNMENT

FIG. 10C  PRIOR ART

A COLOR SHIFT DUE TO A DECREASE IN COLOR TEMPERATURE

FIG. 11A
PRIOR ART

A COLOR SHIFT DUE TO AN INCREASE
IN COLOR TEMPERATURE

FIG. 11B
PRIOR ART

AFTER AUTO WHITE
BALANCE ALIGNMENT

FIG. 11C
PRIOR ART

A COLOR SHIFT DUE TO A FURTHER
INCREASE IN COLOR TEMPERATURE

CHROMINANCE SIGNAL PROCESSING CIRCUIT, CHROMINANCE SIGNAL PROCESSING METHOD AND CAMERA USING THEM

BACKGROUND OF THE INVENTION

1. Field of the Invention

In general, the present invention relates to a chrominance signal processing circuit, a chrominance signal processing method and a camera using the circuit and the method. More particularly, the present relates to a chrominance signal processing circuit having an auto white balance function for automatically establishing white balance through feedback control, a chrominance signal processing method adopted in the circuit and a camera or an image sensing system using solid state image sensing devices such as image sensing devices of a CCD (Charge Coupled Device) type which employs the circuit.

2. Description of the Related Art

Figure 9:
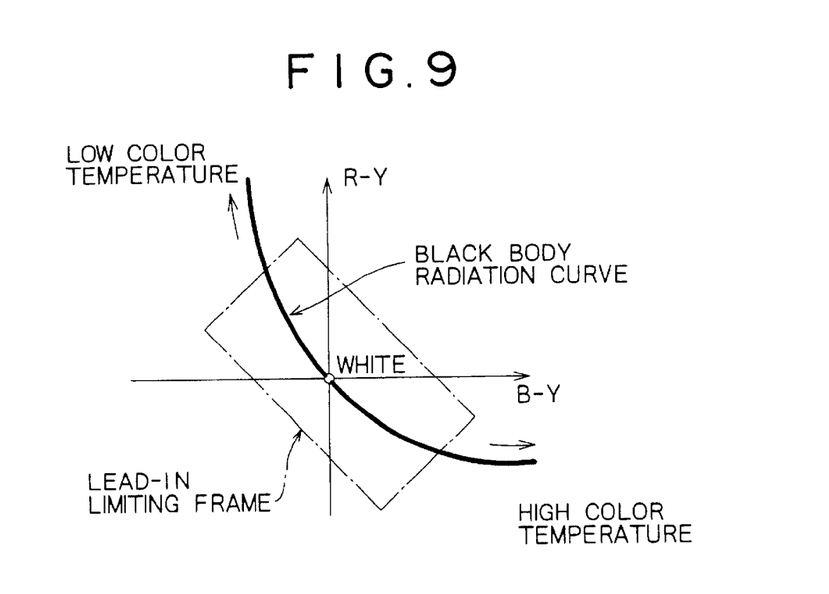
FIG. 9 is a diagram showing a lead-in limiting frame.

Establishment of white balance is adjustment of a white color seen as colored white to colorless white. The white balance adjustment is carried out typically in an image sensing system employing solid state image sensing devices when the white color moves along a black body radiation curve (a black body locus) in accordance with a change in color temperature as shown in FIG. 9, that is, when the color temperature of a photographic object serving as a light source changes. Normally, colored white appears as a reddish white color at a low color temperature and appears as a rather blue white color at a high color temperature. Here, by a color temperature, the temperature (expressed in terms of degrees Kelvin) of a black body having the same chromaticity as a test light source is meant. In FIG. 9, the origin represents the colorless white.

In the white balance adjustment, however, a color which is naturally not white has to be kept as it is. In order to prevent the white balance adjustment from being incorrectly applied to a color which is naturally not white, an lead-in limiting frame shown by a dotted line in FIG. 9 is provided. The lead-in limiting frame is used for limiting a range in which white balance adjustment is to be carried out. A color outside the lead-in limiting frame is not regarded as a drifted white color but is seen as a color which is naturally not white. For such a color, white balance adjustment is not carried out. That is, a lead-in operation is not performed.

In the conventional chrominance signal processing circuit having an auto white balance function adopting a feedback control system, however, once white balance has been established at a certain color temperature, the lead-in limiting frame moves in a manner interlocked with the establishment of the white balance. As a result, there is raised a problem that, when the color temperature changes next time, a color inside the initial lead-in limiting frame which is supposed to be subjected to white balance adjustment is displaced to a position outside the current lead-in limiting frame after the movement, that is, a position exempted from white balance. On the other hand, a color outside the initial lead-in limiting frame which should be exempted from white balance adjustment is displaced to a position inside the current lead-in limiting frame after the movement, that is, a position subjected to white balance adjustment.

Figure 10A:
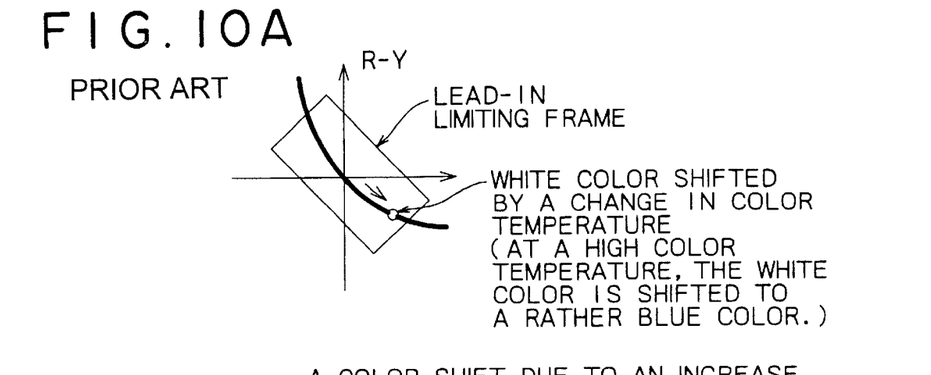
FIGS. 10A to 10C are diagrams of Part 1 used for explaining a problem encountered in the conventional technology.
Figure 10B:
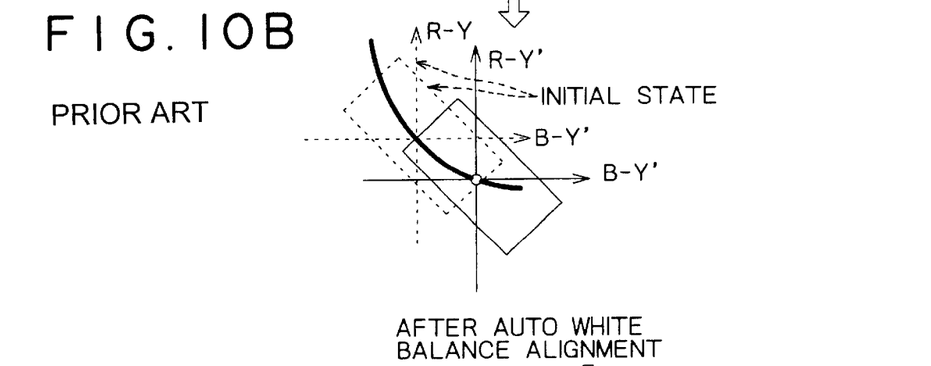
Figure 10C:
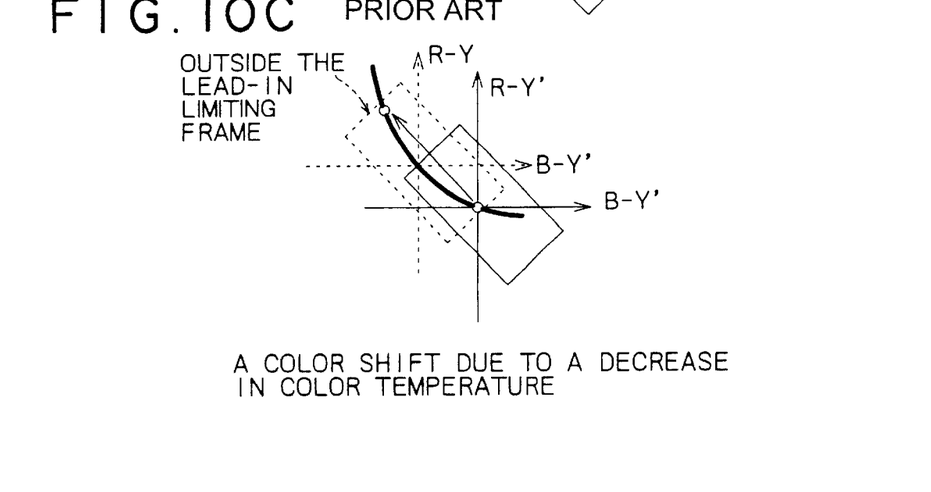

As an example, assume a transition from a certain reference color temperature in a state where white balance has been established to a high color temperature. The transition causes the white color to be shifted in the blue color direction as shown in FIG. 10A. The white color shifted in the blue color direction is adjusted to colorless white shown in FIG. 10B. Then, in a next operation to establish white balance, the lead-in limiting frame shown by a solid line in FIG. 10B is used as a reference. For example, when a transition back to a low color temperature occurs as shown in FIG. 10C afterward, a color which was inside the original lead-in limiting frame shown by a dashed line is now located at a position outside the current lead-in limiting frame shown by the solid line, a position exempted from white balance adjustment.

Figure 11A:
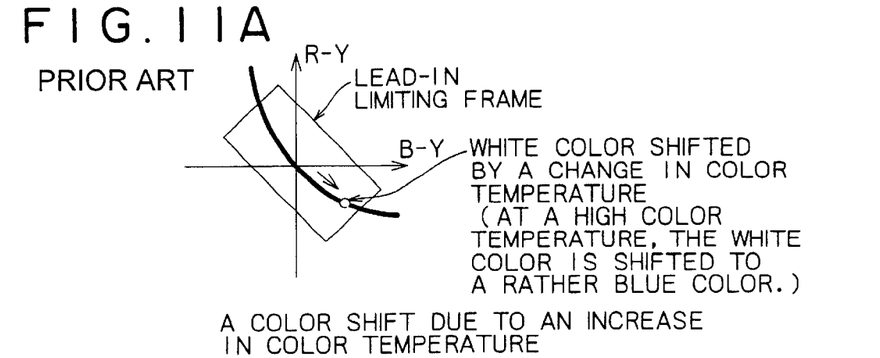
FIGS. 11A to 11C are diagrams of Part 2 used for explaining a problem encountered in the conventional technology.
Figure 11B:
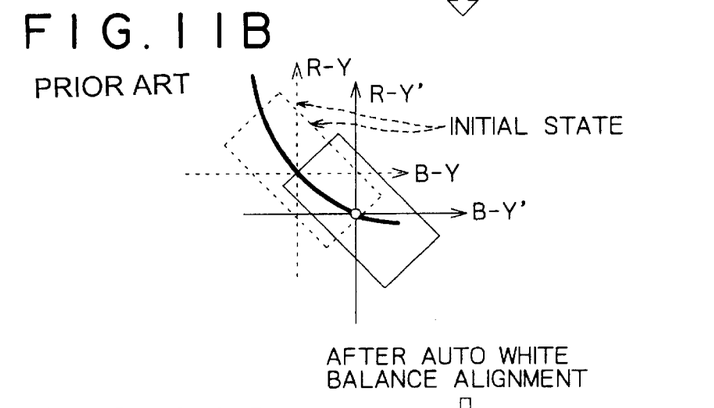
Figure 11C:
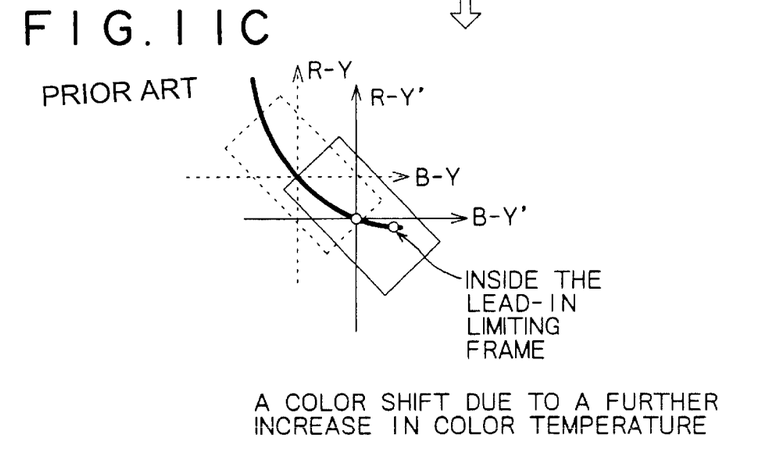

In addition, there is also raised a problem that, in the case of a gradual change in color temperature, new colors are included in the lead-in limiting frame shifted to a new position, making it necessary to eventually apply white balance adjustment to a color at the end of the black body radiation curve representing an extreme color temperature even if the end color was originally outside the initial lead-in limiting frame prior to the shift. For example, assume that a transition has occurred from a state completing white balance adjustment at a reference temperature to a high color temperature where a white color is shifted in the blue color direction as shown in FIG. 11A. In this case, the white color shifted in the blue color direction is subjected to white balance adjustment to shift the white color to colorless white as shown in FIG. 11B. Thereafter, assume that a transition further occurs from the state shown in FIG. 11B to an even higher color temperature shown in FIG. 11C. In this case, a color at the end of the black body radiation curve which was originally outside the initial lead-in limiting frame shown by a dashed line in FIG. 11C eventually becomes subjected to white balance adjustment because the point is now located inside the current lead-in limiting frame indicated by a solid line.

Figure 12A:
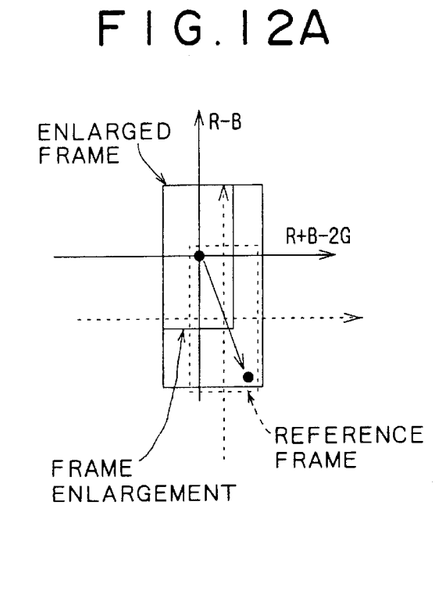
FIGS. 12A to 12D are diagrams showing operations to shrink and enlarge a lead-in limiting frame in accordance with the color temperature of the light source at convergence upon white balance adjustment and the color temperature of the light source after a change in color temperature.
Figure 12B:
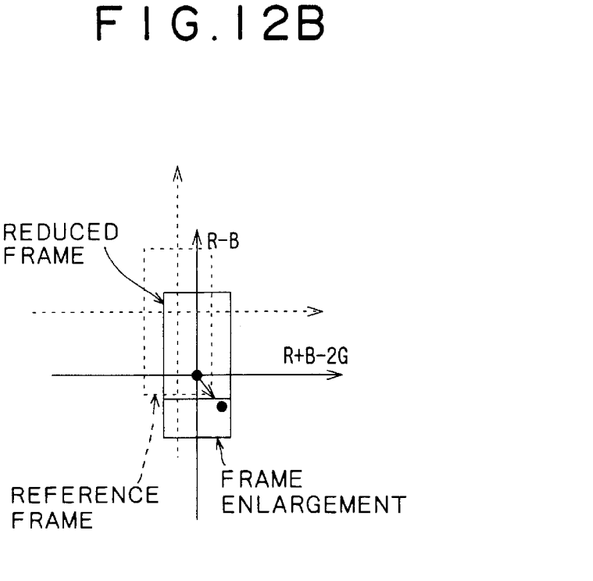
Figure 12C:
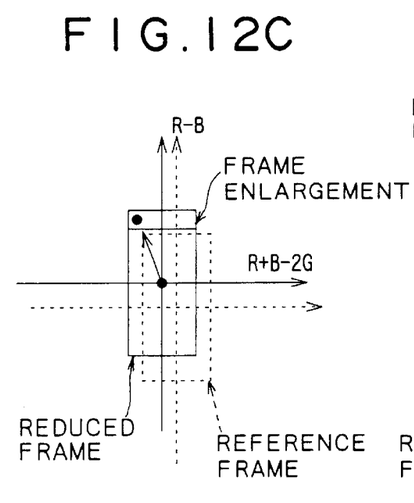
Figure 12D:
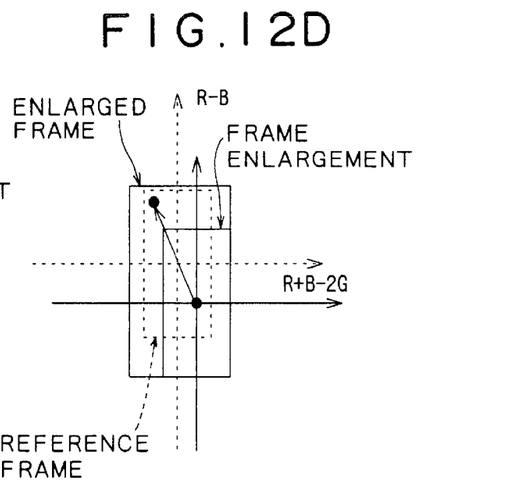

In order to solve the problem described above, the patent applicant has proposed to change the size of the lead-in limiting frame in accordance with the color temperature as disclosed in Japanese Patent Laid-open No. Hei8-122903. To put it in detail, according to this disclosed method, in automatic white balance adjustment carried out by execution of feedback control, a change in color temperature of a light source is recognized. Then, the size of the lead-in limiting frame is changed in accordance with the color temperature of the light source at convergence upon white balance adjustment and the color temperature of the light source after a change in color temperature as shown in FIGS. 12A to 12B to result in control which continuously includes colors subjected to white balance adjustment in a reference lead-in limiting frame set from the beginning. In this method, however, if steps of changing the size of the lead-in limiting frame are not made fine, adequate control can not be executed so that it is feared that an incorrect operation will be resulted in. If the steps are made fine, however, the size of the program will become extremely large.

SUMMARY OF THE INVENTION

The present invention addresses the problem described above. It is thus an object of the present invention to provide a chrominance signal processing circuit and a chrominance signal processing method which are capable of carrying out processing with no white balance error as well as to provide a camera employing the circuit and adopting the method.

The chrominance signal processing circuit provided by the present invention comprises:

white balance amplifiers with relative gains among R, G and B primary color signals thereof adjusted by using a feedback control technique;

an integration circuit for generating integrated values of chrominance difference signals for each field; and a controller for setting a lead-in limiting frame for controlling a range for establishing white balance with a reference point at a predetermined color temperature taken as a base and for continuously monitoring the magnitude of a shift of each of said integrated values output by said integration circuit from said reference point and, for integrated values existing inside said lead-in limiting frame after said shift, controlling said relative gains of said white balance amplifiers in accordance with said integrated values.

According to the chrominance signal processing method provided by the present invention, processing to automatically establish white balance by execution of feedback control comprises the steps of:

setting a lead-in limiting frame for controlling a range for establishing white balance with a reference point at a predetermined color temperature taken as a base; and continuously monitoring the magnitude of a shift of each of said integrated values output by said integration circuit from said reference point and, for integrated values existing inside said lead-in limiting frame after said shift, controlling said gains of said white balance amplifiers in accordance with said integrated values.

The camera provided by the present invention employs the chrominance signal processing circuit with a configuration described above and adopts the chrominance signal processing method.

In white balance adjustment based on feedback control, first of all, at a certain determined color temperature, a reference point to be used as an operation start point is taken and then a lead-in limiting frame for not applying white balance adjustment on colors other than those on a black body radiation curve is set with the reference point taken as a basis. Subsequently, if the color temperature of a photographic object changes, a white balance lead-in operation based on integrated values which are output by the integrated circuit and exist inside the lead-in limiting frame is carried out. In this case, the lead-in limiting frame is not shifted even if the white balance lead-in operation is carried out.

Next, when the color temperature of the photographic object changes, the position or the coordinates of the current movement destination are determined by adding the current integrated values to the movement position or the coordinates of the previous integration values or subtracting the current integrated values from the movement position or the coordinates of the previous integration values depending on the movement direction. That is, the distances of the integrated values from the reference point are being monitored continuously. Then, the integrated values are examined to determine whether or not the values are in the lead-in limiting frame. If the integrated values are in the lead-in limiting frame, a while balance lead-in operation based on the integrated values is carried out. If the integrated values are not in the lead-in limiting frame, on the other hand, the previous position or coordinates are kept as they are till the color temperature of the photographic object changes.

BRIEF DESCRIPTION OF THE DRAWINGS

An embodiment of the present invention will be described with reference to the following diagrams wherein.

DETAILED DESCRIPTION OF THE PREFERRED EMBODIMENT

Figure 1:
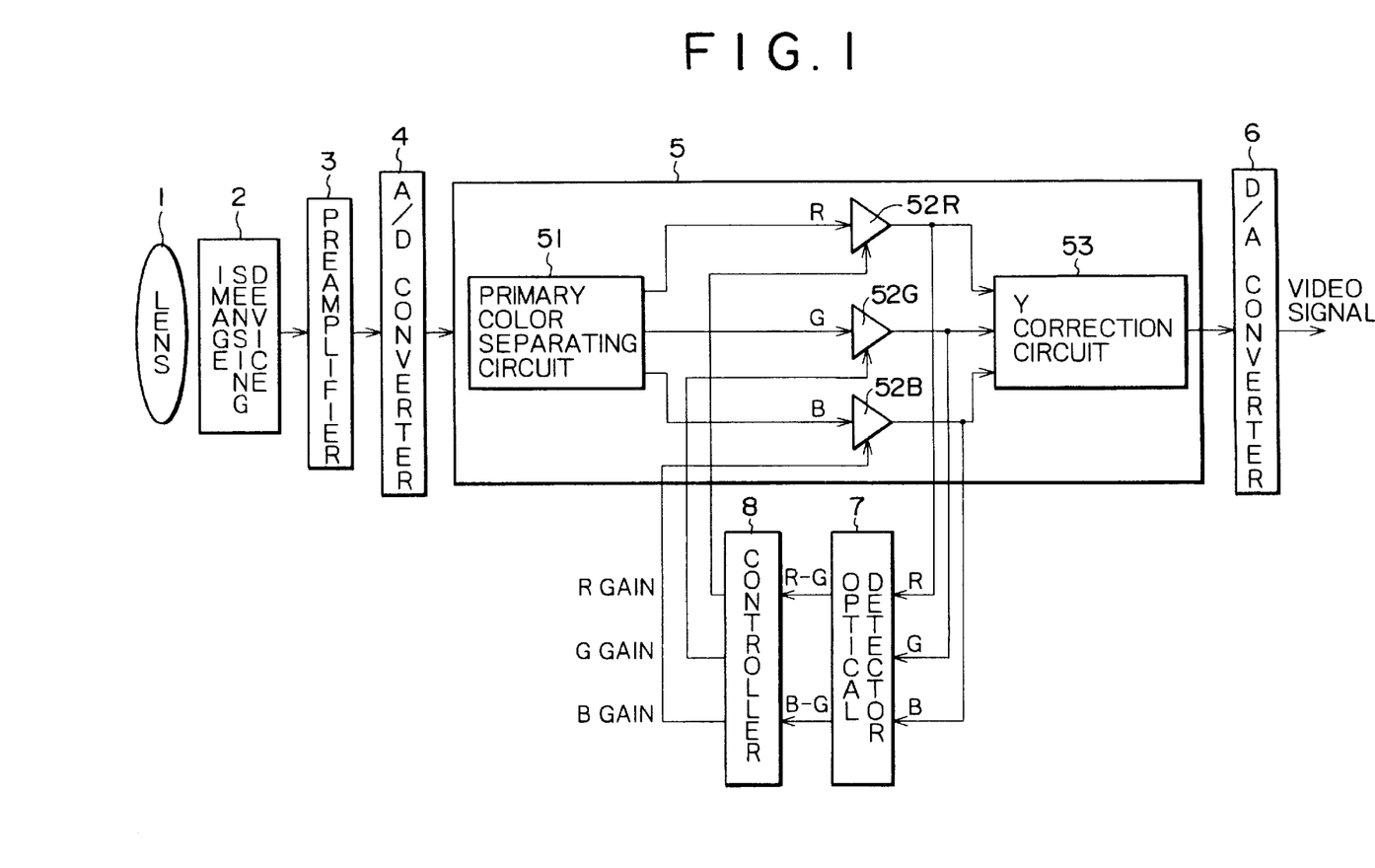
FIG. 1 is a block diagram showing the system configuration of a solid-state image sensing system to which the present invention is applied.

The present invention will become more apparent from a careful study of the following detailed description of a preferred embodiment with reference to the accompanying diagrams. FIG. 1 is a diagram showing the system configuration of a camera or an image sensing system to which the present invention is applied.

In the image sensing system shown in FIG. 1, a lens 1 creates an image on an image sensing surface of a solid-state image sensing device 2 from an incident light coming from a photographic object. Typically, a CCD image sensing device is used as the solid-state image sensing device 2. The solid-state image sensing device 2 converts the light of the image created on the image sensing surface by the lens 1 into an electrical signal which is then supplied to a preamplifier 3. The preamplifier 3 samples and holds the signal output by the solid-state image pickup device 2 in order to extract data from the signal and controls the gain thereof. The output of the preamplifier 3 is converted by an A/D conversion circuit 4 from an analog signal into a digital signal before being supplied to a digital signal processing circuit 5.

The digital signal processing circuit 5 comprises a primary color separating circuit 51 for splitting the digital input signal coming from the A/D conversion circuit 4 into R (red), G (green) and B (blue) primary color signals which are referred to hereafter simply as R, G and B signals, white balance amplifiers 52R, 52G and 52B for establishing white balance by adjusting relative gains among the R, G and B signals and a GAMMA correction circuit 53 for carrying out GAMMA correction in order to reproduce colors with a high degree of fidelity. Here, white balance adjustment is adjustment to produce an equal rate for the R, G and B signals. In the configuration of the image sensing system, the A/D conversion circuit 4 is provided at a stage in front of the digital signal processing circuit 5 as described above. It should be noted that the A/D conversion circuit 4 can also be provided in the digital signal processing circuit 5.

In an operation to carry out white balance adjustment in the digital signal processing circuit 5, the gains of the white balance amplifiers 52R, 52G and 52B are adjusted so that the following equations hold true:

$$R \times R \text{ gain} = B \times B \text{ gain} = G \times G \text{ gain}$$

or $$R \times R \text{ gain} - G \times G \text{ gain} = B \times B \text{ gain} - G \times G \text{ gain} = 0$$

In this embodiment, white balance adjustment is carried out by controlling the gains of the white balance amplifiers 52R, 52G and 52B as described above. It should be noted that white balance adjustment can also be carried out by, for example, fixing the gain of the white balance amplifier 52G and controlling the gains of the white balance amplifiers 52R and 52B for the 2 R and B signals respectively with the G signal taken as a reference. As a matter of fact, the white balance amplifier 52G for the G signal can be eliminated in this case.

The R, G and B signals completing the white balance adjustment are subjected to signal processing as GAMMA correction and combined with a luminance (Y) signal not shown in the figure to produce a video signal. The video signal is further supplied to a D/A conversion circuit 6 for converting the video signal from digital data into an analog signal. It should be noted that, much like the A/D conversion circuit 4, the D/A conversion circuit 6 can also be embedded in the digital signal processing circuit 5. The R, G and B signals leaving the white balance amplifiers 52R, 52G and 52B are also supplied to an optical detector (OPD) 7.

Figure 2:
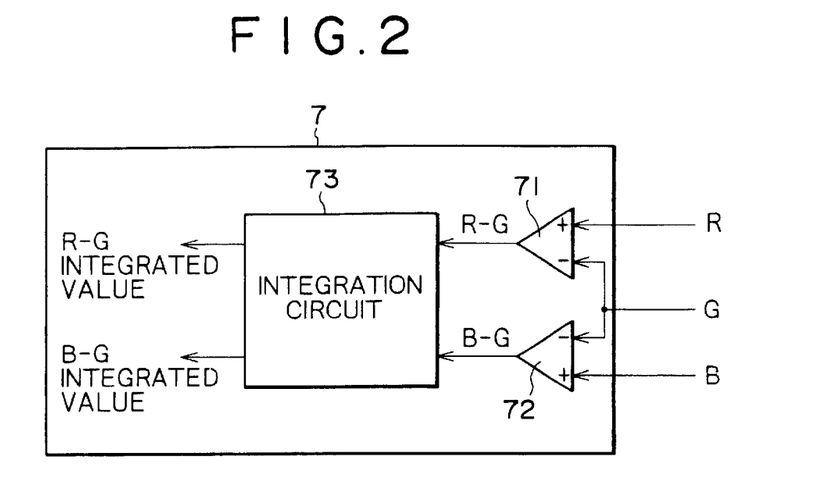
FIG. 2 is a block diagram showing a typical circuit configuration of an optical detector employed in the solid-state image sensing system.

FIG. 2 is a diagram showing a typical circuit configuration of the optical detector 7. As shown in the figure, the optical detector 7 comprises a subtracter 71 for subtracting the G signal from the R signal, a subtracter 72 for subtracting the G signal from the B signal and an integration circuit 73 for integrating chrominance difference signals for each field. The chrominance difference signals are an R–G signal and a B–G signal output by the subtracters 71 and 72 respectively.

Figure 3:
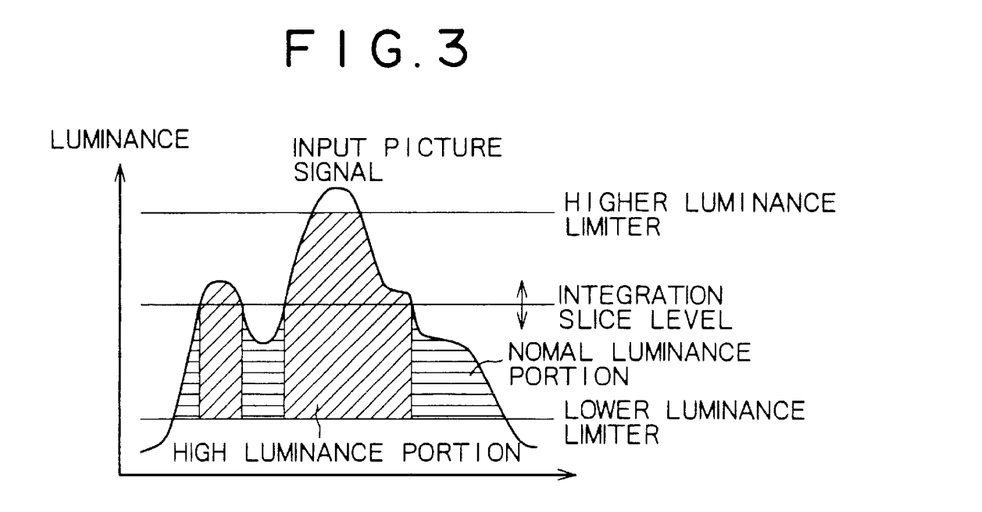
FIG. 3 is a diagram showing a range of integration of an integration circuit employed in the detector.

As shown in FIG. 3, a range of integration of the integration circuit 73 is divided by an integration slice level into 2 portions with different degrees of luminance, namely, a high luminance portion and a normal luminance portion. In the high luminance portion, only data (R–G and B–G) with a degree of luminance higher than the integration slice level is integrated. In the normal luminance portion, on the other hand, only data (R–G and B–G) with a degree of luminance lower than the integration slice level is integrated. It should be noted that an extremely high degree of luminance will result in saturation. In order to solve a saturation problem, an upper luminance limiter is set and data with a degree of luminance higher than the upper luminance limiter is not integrated. On the other hand, data with a very low degree of luminance is regarded as noise. By the same token, in order to solve a noise problem, a lower luminance limiter is set and data with a degree of luminance lower than the lower luminance limiter is also not integrated.

As described above, the optical detector 7 is provided with a variety of limiters and carries out special processing in order to prevent white balance processing from being carried out incorrectly under particular conditions such as a single color over the entire surface. Then, data (R–G and B–G) representing integrated values resulting from integration in high and normal luminance portions of the integration range for each field is supplied to the controller 8. In this embodiment, the chrominance difference signals R–G and B–G are first derived from the R, G and B signals and then integrated as described above. It should be noted, however, that the R, G and B signals can also be integrated first and then the chrominance difference signals R–G and B–G are found from the integrated R, G and B signals.

Figure 4:
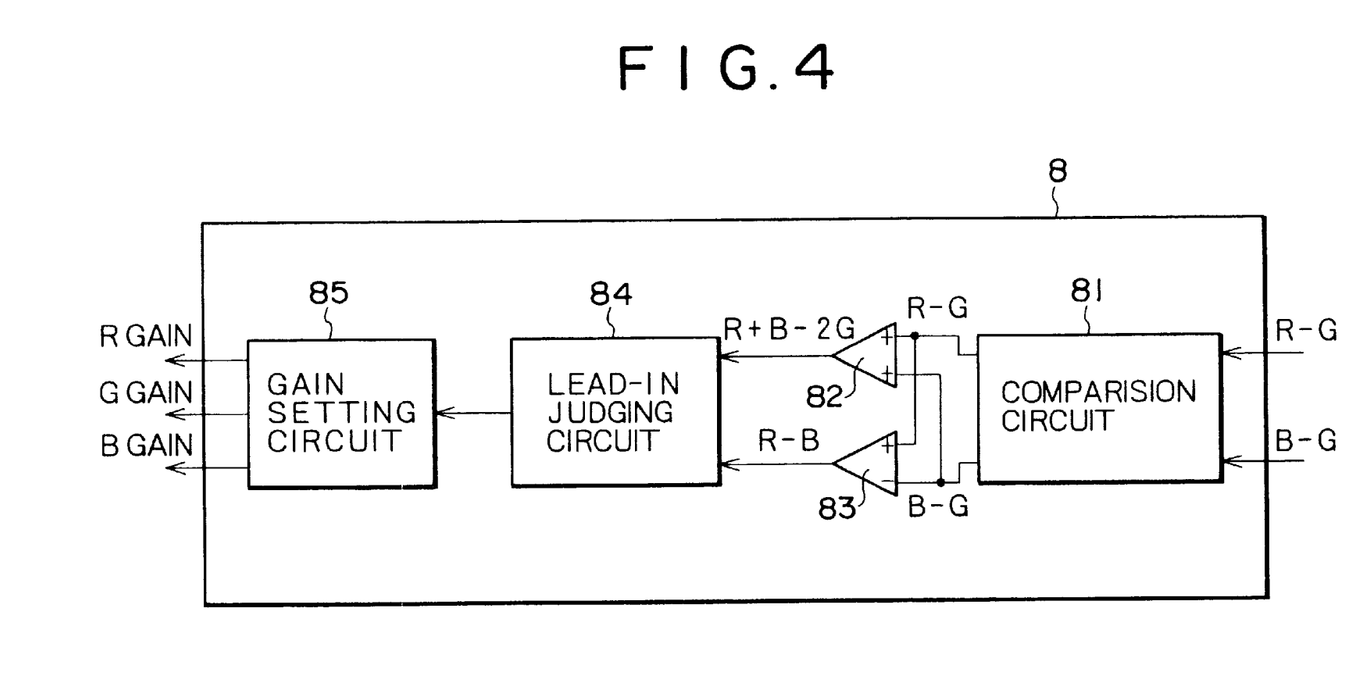
FIG. 4 is a functional block diagram showing a typical configuration of a controller employed in the solid-state image sensing system.

The controller 8 is implemented typically by a microcomputer. FIG. 4 is a diagram showing a typical functional block of the controller 8.

As shown in the figure, the controller 8 comprises components for executing a variety of functions. The components are a comparator circuit 81 for comparing the integrated value data (R–G and B–G) of the high luminance portion supplied by the optical detector 7 with the integrated value data (R–G and B–G) of the normal luminance portion and outputting the integrated value data closer to 0 than the other, an adder 82 for adding the integrated value data (R–G) to the integrated value data (B–G) output by the comparator circuit 81 to produce data (R+B–2G), a subtracter 83 for subtracting the integrated value data (B–G) from the integrated value data (R–G) output by the comparator circuit 81 to produce data (R–B), a lead-in judging circuit 84 for forming a judgment on a lead-in operation to be described later and a gain setting circuit 85 for setting gains for the R, G and B signals based on the data (R+B–2G) and the data (R–G) in the case of a judgment outcome indicating a required lead-in operation.

As described above, integrated value data resulting from integration of the chrominance difference signals R–G and B–G is converted into the data R+B–2G and R–B by addition and subtraction respectively which are each implemented as simple processing to carry out the data conversion so that the load of software can be reduced. The data R+B–2G and R–B is computed by software executed by a microcomputer implementing the controller 8. It should be noted, however, that the functions of the comparator 81, the adder 82, the subtracter 83, the lead-in judging circuit 84 and the gain setting circuit 85 employed in the controller 8 can also be implemented by hardware in place of software. In this case, the simple addition and the subtraction processing allows the load of the hardware to be reduced.

Information on the R, B and G gains set by the controller 8 on the basis of the data R+B–2G and R–B is fed back to the white balance amplifiers 52R, 52G and 52B employed in the digital signal processing circuit 5 to be used in the adjustment of gains for the R, G and B signals.

In this feedback control, the processing to align white balance by software based on the data R+B–2G and R–B comprises the steps of:

setting a lead-in limiting frame for limiting a range subjected to white balance adjustment with a reference point (0, 0) at a certain color temperature of typically 3,200 degrees Kelvin taken as a base;

continuously monitoring the amount of a shift of evaluation value data (integrated value data) supplied by the optical detector 7 from the reference point (0, 0); and forming a judgment as to whether the shifted evaluation value data exists inside the lead-in limiting frame and, in the case of evaluation value data existing inside the lead-in limiting frame, controlling the gain for the R, G and B signals in accordance with the evaluation value data.

In order to align white balance, first of all, the integrated value data of the high luminance portion is compared with the integrated value data of the normal luminance portion and the integrated value data closer to 0 than the other is selected. In the example shown in FIG. 5, since the integrated value data of the high luminance portion is closer to 0 than the integrated value data of the normal luminance portion is, the former is used. Then, a judgment as to what coordinate position the evaluation value data is located at is formed. If the evaluation value data is inside the lead-in limiting frame, the white balance gains are adjusted by the coordinate position (image limit or a position on an axis), taking it to a position in close proximity to the origin (R−G=0 and B−G=0).

Figure 5:
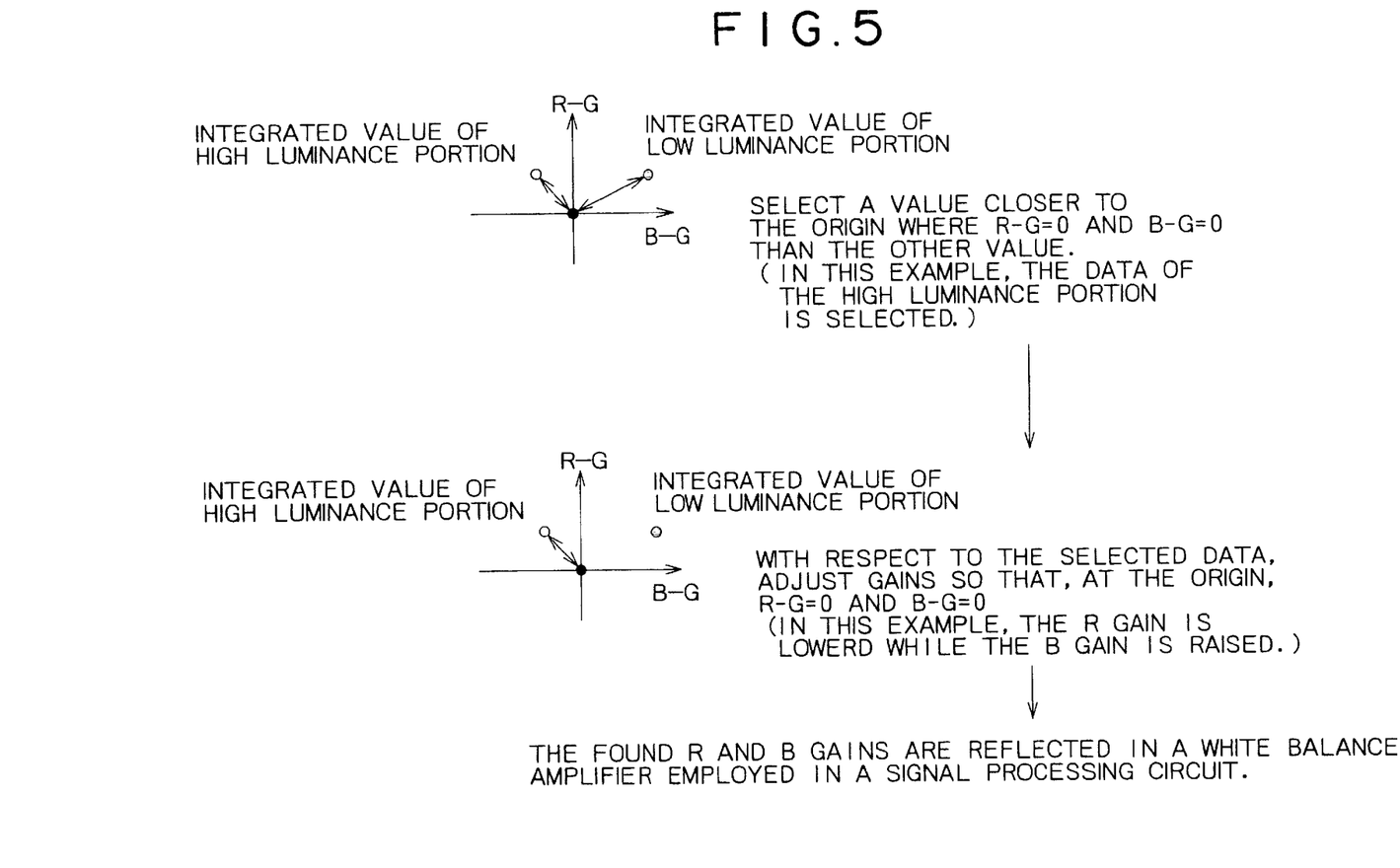
FIG. 5 is a conceptual diagram showing an example of a white balance operation.

In this feedback control, the evaluation value data (the integrated value data) supplied by the optical detector 7 may exist outside the lead-in limiting frame. In this case, a lead-in operation to align the white balance is not carried out. It should be noted that a lead-in limiting frame is set in order to avoid an incorrect operation to lead in a color which is originally not white. That is, the lead-in limiting frame is used for preventing a color not on the black body radiation curve from being subjected to a led-in operation. Examples of colors not on the black body radiation curve are green and violet colors.

Figure 6:
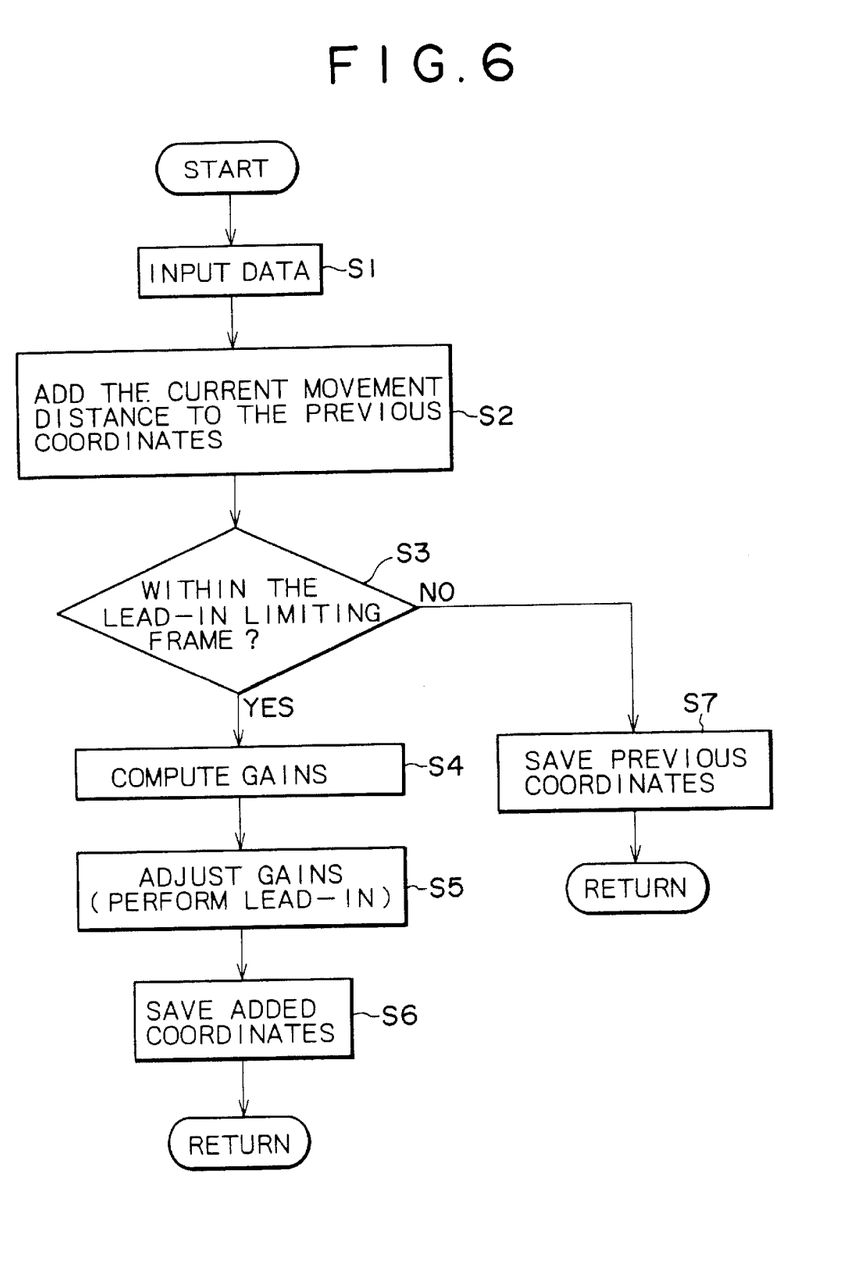
FIG. 6 shows a flowchart representing a processing procedure of white balance adjustment.

The following is a description of a procedure of actual processing carried out by the controller 8 to align white balance based on the data R+B−2G and R−B with reference to a flowchart shown in FIG. 6. It should be noted that the routine representing the processing is called for execution when the color temperature of the photographic object changes. In addition, before starting the execution of the routine, at a color temperature of typically 3,200 degrees Kelvin determined in advance, a lead-in limiting frame based on the reference point (0, 0) is set and the reference point (0, 0) is used as an operation start point of auto white balance.

As shown in FIG. 6, the flowchart begins with a step S1 at which evaluation value data, that is, pieces of integrated value data R−G and B−G, are received from the optical detector (OPD) 7 when the color temperature changes. The flow of the processing then goes on to a step S2 at which the current data is added to data held previously, that is, a distance of movement is added to previous coordinates. It should be noted that, in the case of movement in the minus direction, the current data is subtracted from the data held previously. Then, the flow of the processing proceeds to a step S3 to form a judgment as to whether or not the post-movement coordinates are in the previously set lead-in limiting frame based on the reference point (0, 0).

If the post-movement coordinates are in the previously set lead-in limiting frame, the flow of the processing continues to a step S4 at which white balance gains are computed on the basis of the evaluation value data received from the optical detector 7. The flow of the processing then goes on to a step S5 at which a gain operation (or a lead-in operation) to be described later is carried out in accordance with the computed white balance gains. Then, the flow of processing proceeds to a step S6 at which coordinates after the movement are saved. If the post-movement coordinates are not in the previously set lead-in limiting frame, on the other hand, the flow of the processing continues to a step S7 at which coordinates before the movement are held till a next change in photographic object color temperature without carrying out a lead-in operation.

As described above, the processing to align white balance comprises the steps of:

setting a lead-in limiting frame for limiting a range subjected to white balance adjustment with a reference point (0, 0) at a certain color temperature taken as a base;

continuously monitoring the amount of a shift from the reference point (0, 0); and forming a judgment as to whether coordinates after the shift exist inside the lead-in limiting frame and, in the case of coordinates after the shift found inside the lead-in limiting frame, carrying out a white balance lead-in operation in accordance with the coordinate data.

As a result, since the reference of a lead-in judgment after convergence is fixed, auto white balance can be implemented without shifting the reference to give rise to an incorrect operation by feedback control.

Figure 7:
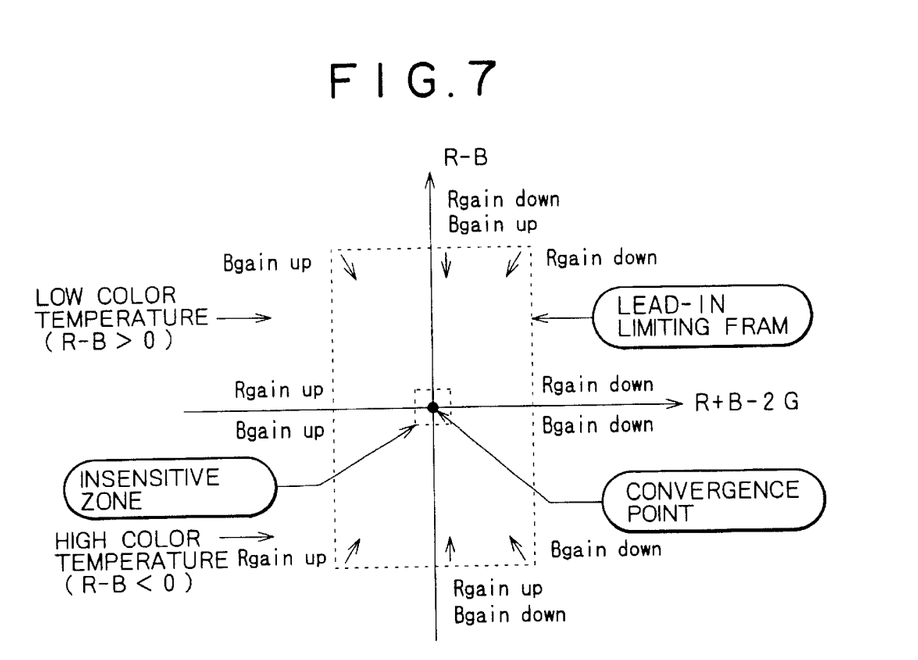
FIG. 7 is a conceptual diagram showing adjustment of gains in white balance adjustment.

The following is a description of a gain operation for a lead-in operation and a convergence point, an insensitivity zone and the lead-in limiting frame with reference to FIG. 7. A sensitive zone is provided in order to avoid oscillation in case a zero is not perfectly achieved, that is, the lead-in operation does not converge to the origin. In FIG. 7, for data existing in the $1^{st}$ quadrant, the gain (the R gain) of the white balance amplifier 52R is reduced and, for data existing in the $2^{nd}$ quadrant, on the other hand, the gain (the B gain) of the white balance amplifier 52B is increased. In the case of data existing in the $3^{rd}$ quadrant, the R gain is increased and, in the case of data existing in the $4^{th}$ quadrant, on the other hand, the B gain is decreased.

When data is on the (R−B) axis or the (R+B−2G) axis, both the B and R gains are changed. To put it in detail, for data on the (R+B−2G) axis with (R+G−2G)>0, both the R and B gains are decreased and for data on the (R+B−2G) axis with (R+G−2G)<0, on the other hand, both the R and B gains are increased. In the case of data on the (R−B) axis with (R−B)>0, both the R and B gains are increased and for data on the (R−B) axis with (R−B)<0, on the other hand, both the R and B gains are decreased.

Figure 8A:
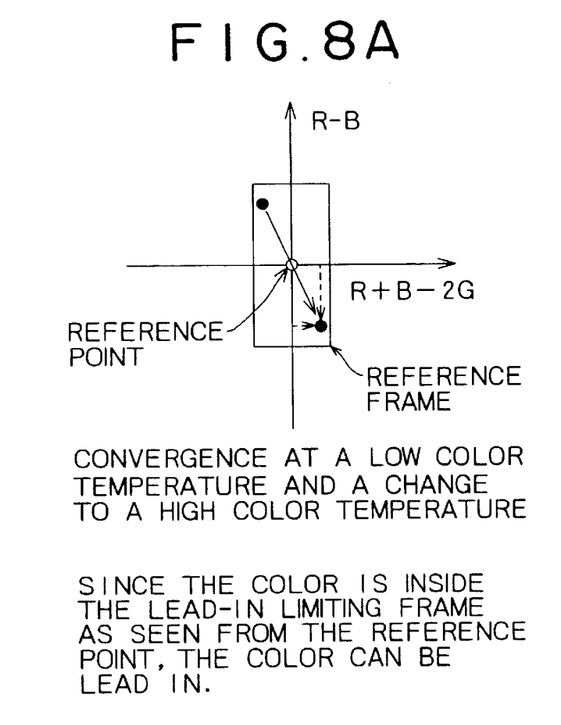
FIGS. 8A to 8D are diagrams each showing how a judgment is formed in the event of a change in color temperature.
Figure 8B:
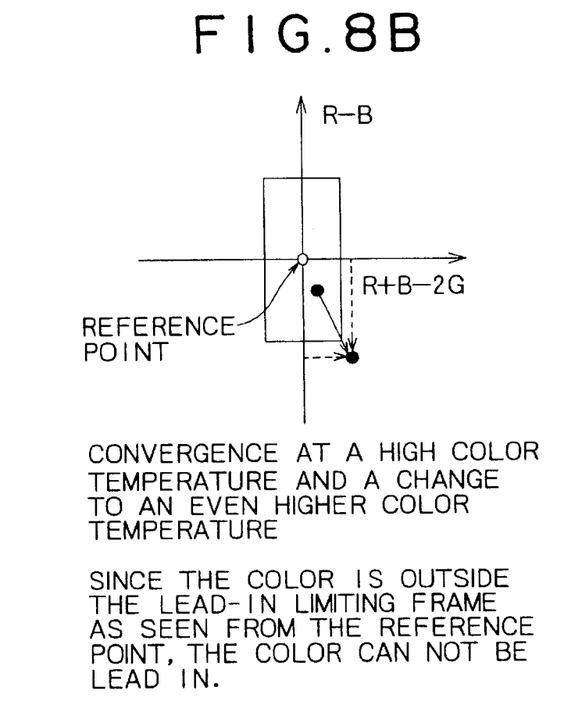
Figure 8C:
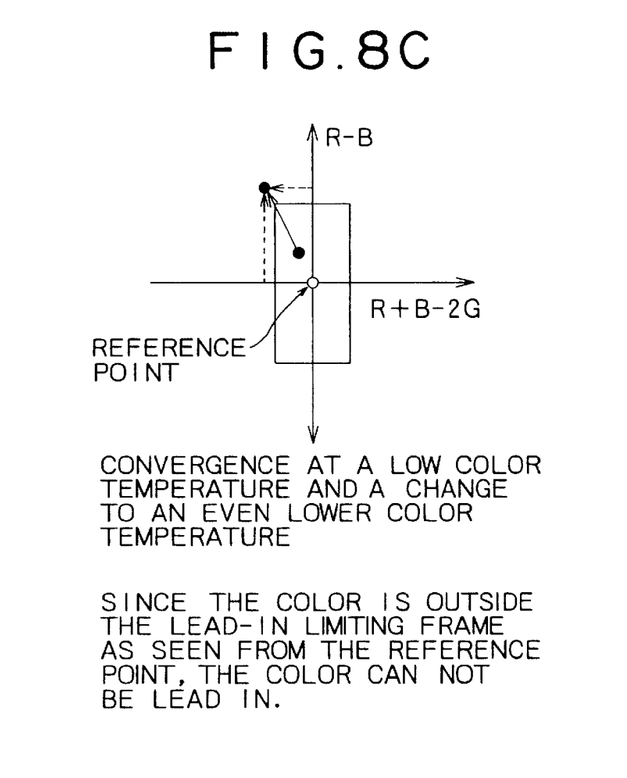
Figure 8D:
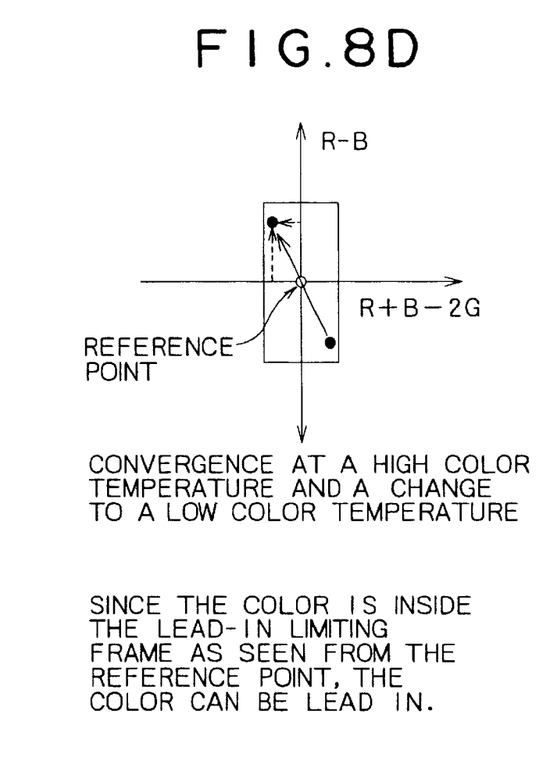

The following is a description of how a decision is made in the event of a change in color temperature with reference to FIGS. 8A to 8D. FIG. 8A is a diagram showing a case in which a previous operation has resulted in convergence at a low color temperature and a current operation is carried out in the event of an increase in color temperature. FIG. 8B is a diagram showing a case in which a previous operation has resulted in convergence at a high color temperature and a current operation is carried out in the event of a further increase in color temperature. FIG. 8C is a diagram showing a case in which a previous operation has resulted in convergence at a low color temperature and a current operation is carried out in the event of a further decrease in color temperature. FIG. 8D is a diagram showing a case in which a previous operation has resulted in convergence at a high color temperature and a current operation is carried out in the event of a decrease in color temperature.

In the first place, in the case of FIG. 8A wherein a previous operation has resulted in convergence at a low color temperature and then the color temperature increases, since coordinates of a position after movement from the reference point are inside the lead-in limiting frame, a normal lead-in operation is carried out. In the second place, in the case of FIG. 8B wherein a previous operation has resulted in convergence at a high color temperature and then the color temperature further increases, since coordinates of a position after movement from the reference point are outside the lead-in limiting frame, no lead-in operation is carried out. In the third place, in the case of FIG. 8C wherein a previous operation has resulted in convergence at a low color temperature and then the color temperature further decreases, since coordinates of a position after movement from the reference point are outside the lead-in limiting frame, no lead-in operation is carried out. In the fourth place, in the case of FIG. 8D wherein a previous operation has resulted in convergence at a high color temperature and then the color temperature decreases, since coordinates of a position after movement from the reference point are inside the lead-in limiting frame, a normal lead-in operation is carried out.

As described above, in the chrominance signal processing circuit employed in a camera system, an operation to automatically establish white balance by feedback control is carried out by monitoring the amount of a shift from the reference point in dependence on a variety of conditions and forming a judgment as to whether coordinates after the shift exist inside a lead-in limiting frame and, depending on the outcome of the judgment, carrying out a white balance lead-in operation so that control not departing from the lead-in limiting frame set from the beginning can be executed.

That is, when the color temperature changes after white balance has been established for a light source at a certain color temperature prior to the change, if a color to be adjusted to the white color at the new color temperature is within the reference lead-in limiting frame, white balance is reestablished. Otherwise, white balance is not reestablished. In this way, operation to establish white balance with no error can be carried out. As for a non-white color, operation not to change it to an uncolored one can be carried out.

It should be noted that the camera system provided by the present invention can be used as a camera with an auto white balance function for production, business and consumer applications. The function contributes much to improvement of the picture quality of these cameras.

As described above, the white balance adjustment of the feedback control system according to the present invention comprises the steps of:

setting a lead-in limiting frame for limiting a range subjected to white balance adjustment with a reference point at a certain color temperature taken as a base;

continuously monitoring the amount of a shift from the reference point; and forming a judgment as to whether coordinates after the shift exist inside the lead-in limiting frame and, in the case of coordinates after the shift found inside the lead-in limiting frame, carrying out a white balance lead-in operation in accordance with the coordinate data.

As a result, since the reference of a lead-in judgment after convergence is fixed, auto white balance can be implemented without shifting the reference to give rise to an incorrect operation by feedback control. Thus, when the camera system provided by the present invention is used as a camera with an auto white balance function for production, business and consumer applications, the function contributes much to improvement of the picture quality of these cameras.

What is claimed is:

1. A chrominance signal processing circuit for carrying out processing to automatically establish white balance by execution of feedback control, said chrominance signal processing circuit comprising:

white balance amplifiers with relative gains among chrominance signals thereof adjusted;

an integration circuit for producing an integrated value for each field of color difference signals; and a controller for setting a lead-in limiting frame for limiting a range for establishing white balance with a reference point at a predetermined color temperature taken as a base and for continuously monitoring the magnitude of a shift of said integrated value output by said integration circuit from said reference point and, for integrated value existing inside said lead-in limiting frame after said shift, controlling said relative gains of said white balance amplifiers in accordance with said integrated value; and wherein the controller is adapted to determine a high luminescence integrated pre-value and a low luminescence integrated pre-value and select the closer of the high luminescence or low luminescence integrated pre-values to the reference point as the integrated value.

2. A chrominance signal processing circuit according to claim 1, wherein said chrominance signals are R (red), G (green) and B (blue) primary color signals.

3. A chrominance signal processing circuit according to claim 2, wherein said integration circuit integrates color difference signals R−G and B−G to produce integrated values for each field of said color difference signals whereas said controller converts said integrated values into signals R−B and R+B−2G by performing addition and subtraction on said integrated values and controls said relative gains of said white balance amplifiers on the basis of said signals R−B and R+B−2G.

4. The chrominance signal processing circuit according to claim 1, wherein the controller is adapted to establish a lower luminescence limiter that places a lower limit on the data used to generate the low luminescence integrated pre-value.

5. The chrominance signal processing circuit according to claim 1, wherein the controller is adapted to establish a higher luminescence limiter that establishes a higher limit to the data used to generate the high luminescence integrated pre-value.

6. The chrominance signal processing circuit according to claim 1, wherein the integrated value is sent only to the controller.

7. A chrominance signal processing method of carrying out processing to automatically establish white balance by execution of feedback control, said chrominance signal processing method comprising the steps of:

setting a lead-in limiting frame for limiting a range for establishing white balance with a reference point at a predetermined color temperature taken as a base;

continuously monitoring the magnitude of a shift of an integrated value for each field of a color difference signal from said reference point;

for an integrated value existing inside said leading limit frame after said shift, establishing white balance in accordance with said integrated values; and determining a high luminescence integrated pre-value and a low luminescence integrated pre-value and selecting the closer of the high luminescence or low luminescence integrated pre-values to the reference point as the integrated value.

8. The chrominance signal processing method according to claim 7, further comprising the step of establishing a lower luminescence limiter that places a lower limit on the data used to generate the low luminescence integrated pre-value.

9. The chrominance signal processing method according to claim 7, further comprising the step of establishing a higher luminescence limiter that establishes a higher limit to the data used to generate the high luminescence integrated pre-value.

10. A camera comprising:

an optical system for creating an image from incident light coming from a photographic object;

a solid-state image sensing device for converting light of said image created on an image sensing surface by said optical system into an electrical signal;

a chrominance signal processing circuit for processing said electrical signal output by said solid-state image sensing device and for carrying out processing to automatically establish white balance by execution of feedback control wherein said chrominance signal processing circuit comprises:

white balance amplifiers with relative gains among chrominance signals thereof adjusted;

an integration circuit for producing an integrated value for each field of said color difference signals;

a controller for setting a lead-in limiting frame for limiting a range of establishing white balance with a reference point at a predetermined color temperature taken as a base and for continuously monitoring the magnitude of a shift of said integrated value output by said integration circuit from said reference point and, for an integrated value existing inside said lead-in limiting frame after said shift, controlling said relative gains of said white balance amplifiers in accordance with said integrated value; and determining a high luminescence integrated pre-value and a low luminescence integrated pre-value and selecting the closer of the high luminescence or low luminescence integrated pre-values to the reference point as the integrated value.

11. A camera according to claim 10, wherein said chrominance signals are R (red), G (green) and B (blue) primary color signals.

12. The camera according to claim 10, wherein the controller is adapted to establish a lower luminescence limiter that places a lower limit on the data used to generate the low luminescence integrated pre-value.

13. The camera according to claim 12, wherein the controller is adapted to establish a higher luminescence limiter that establishes a higher limit to the data used to generate the high luminescence integrated pre-value.

14. The camera according to claim 10, wherein the integrated value is sent only to the controller.

* * * * *